(12) United States Patent
Kim et al.

(10) Patent No.: US 10,581,548 B2
(45) Date of Patent: Mar. 3, 2020

(54) METHOD AND APPARATUS FOR TRANSMITTING PRIMARY SYNCHRONIZATION SIGNAL IN WIRELESS ACCESS SYSTEM

(71) Applicant: LG ELECTRONICS INC., Seoul (KR)

(72) Inventors: Kijun Kim, Seoul (KR); Bonghoe Kim, Seoul (KR); Yunjung Yi, Seoul (KR); Seokmin Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/065,372

(22) PCT Filed: Dec. 13, 2016

(86) PCT No.: PCT/KR2016/014585
§ 371 (c)(1),
(2) Date: Jun. 22, 2018

(87) PCT Pub. No.: WO2017/111378
PCT Pub. Date: Jun. 29, 2017

(65) Prior Publication Data
US 2019/0028224 A1    Jan. 24, 2019

Related U.S. Application Data

(60) Provisional application No. 62/387,430, filed on Dec. 24, 2015, provisional application No. 62/275,791, filed on Jan. 7, 2016.

(51) Int. Cl.
| | |
|---|---|
| *H04L 27/32* | (2006.01) |
| *H04J 11/00* | (2006.01) |
| *H04L 27/26* | (2006.01) |
| *H04J 13/00* | (2011.01) |
| *H04L 5/00* | (2006.01) |

(52) U.S. Cl.
CPC .......... *H04J 11/0073* (2013.01); *H04J 13/00* (2013.01); *H04J 13/0062* (2013.01);
(Continued)

(58) Field of Classification Search
CPC .... H04J 11/0073; H04J 13/0062; H04J 13/00; H04L 27/2692; H04L 27/2636;
(Continued)

(56) References Cited

U.S. PATENT DOCUMENTS

| | | |
|---|---|---|
| 2012/0163503 A1 | 6/2012 | Ancora et al. |
| 2015/0023331 A1 | 1/2015 | You et al. |

(Continued)

OTHER PUBLICATIONS

3GPP418, Nov. 2015, (Ericsson, NB-IOT Improved Synchronization Channel R1-157418).*

(Continued)

*Primary Examiner* — Lakeram Jangbahadur
(74) *Attorney, Agent, or Firm* — Birch, Stewart, Kolasch & Birch, LLP

(57) ABSTRACT

The present invention provides a method and an apparatus for transmitting a primary synchronization signal in a wireless access system. As an example, the present invention may be also applied to a wireless access system for supporting narrow band internet of things (NB-IoT). In the present invention, proposed is a method for mapping a primary synchronization signal (PSS) to a plurality of orthogonal frequency division multiplexing (OFDM) symbols separated by cyclic prefix (CP).

14 Claims, 14 Drawing Sheets

(52) U.S. Cl.
CPC ........ *H04L 5/0007* (2013.01); *H04L 27/2613* (2013.01); *H04L 27/2636* (2013.01); *H04L 27/2678* (2013.01); *H04L 27/2692* (2013.01); H04L 27/2607 (2013.01)

(58) Field of Classification Search
CPC . H04L 5/0051; H04L 27/2613; H04L 5/0007; H04L 27/2678; H04L 27/2607
See application file for complete search history.

(56) References Cited

U.S. PATENT DOCUMENTS

| | | | |
|---|---|---|---|
| 2017/0238344 A1* | 8/2017 | McGowan | ............ H04L 5/0007 370/329 |
| 2018/0249467 A1* | 8/2018 | Zheng | ................. H04L 27/2607 |
| 2018/0338321 A1* | 11/2018 | Shepard | ............... H04B 7/0452 |

OTHER PUBLICATIONS

Ericsson, "NB-IoT—Improved Synchronization Channel Design," 3GPP TSG-RAN WG1 #83, R1-157418, Anaheim, California, USA, Nov. 16-20, 2015, pp. 1-4.

Qualcomm Inc., "Sequence Design for NB-IoT SYNC Channel," 3GPP TSG RAN WG1 #83, R1-157069, Anaheim; USA, Nov. 15-22, 2015, 5 pages.

ZTE, "Considerations on Synchronization Signal Design of NB-IoT," 3GPP TSG RAN WG1 Meeting #83, R1-156625, Anaheim, USA, Nov. 15-22, 2015, pp. 1-5.

* cited by examiner

METHOD AND APPARATUS FOR TRANSMITTING PRIMARY SYNCHRONIZATION SIGNAL IN WIRELESS ACCESS SYSTEM

CROSS REFERENCE TO RELATED APPLICATIONS

This application is the National Phase of PCT/KR2016/014585 filed on Dec. 13, 2016, which claims priority under 35 U.S.C. § 119(e) to U.S. Provisional Application Nos. 62/387,430 and 62/275,791 filed on Dec. 24, 2015 and Jan. 7, 2016, all of which are hereby expressly incorporated by reference into the present application.

TECHNICAL FIELD

The present invention relates to a wireless access system, and more particularly, to a method and an apparatus for generating and transmitting a synchronization signal.

For example, the present invention may be applied to a wireless access system for supporting a narrow band internet of things (NB-IoT).

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An aspect of the present disclosure is to provide a method for transmitting and receiving data and/or control information for a narrowband Internet of things (NB-IoT) user equipment (UE).

Another aspect of the present invention is to provide a method for generating and transmitting a primary synchronization signal in an NB-IoT system.

Another aspect of the present disclosure is to provide apparatuses supporting the above methods.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

Technical Solution

The present invention provides methods and apparatuses for transmitting and receiving a synchronization signal in a wireless access system.

A method for transmitting a primary synchronization signal (PSS) in a wireless access system according to the present invention comprises the steps of generating a primary synchronization signal sequence for being mapped into K (a natural number which is K>1) OFDM (orthogonal Frequency Division Multiplexing) symbols, the primary synchronization signal sequence being generated considering a CP (Cyclic Prefix) length included in the K OFDM symbols; generating K primary synchronization signal subsequences respectively corresponding to the K OFDM symbols from the primary synchronization signal sequence, wherein the Nth primary synchronization signal subsequence mapped into the Nth (1≤N≤K) OFDM symbol among the K OFDM symbols includes a sequence of a certain length corresponding to the Nth OFDM symbol of the primary synchronization signal sequence; respectively mapping the K primary synchronization signal subsequences to corresponding OFDM symbols; and transmitting the primary synchronization signal mapped into the K OFDM symbols.

In another aspect of the present invention, an eNB for transmitting a primary synchronization signal (PSS) in a wireless access system comprises a transmitter; and a processor, wherein the processor generates a primary synchronization signal sequence for being mapped into K (a natural number which is K>1) OFDM (orthogonal Frequency Division Multiplexing) symbols, the primary synchronization signal sequence being generated considering a CP (Cyclic Prefix) length included in the K OFDM symbols, generates K primary synchronization signal subsequences respectively corresponding to the K OFDM symbols from the primary synchronization signal sequence, wherein the Nth primary synchronization signal subsequence mapped into the Nth (1≤N≤K) OFDM symbol among the K OFDM symbols includes a sequence of a certain length corresponding to the Nth OFDM symbol of the primary synchronization signal sequence, respectively maps the K primary synchronization signal subsequences to corresponding OFDM symbols, and transmits the primary synchronization signal mapped into the K OFDM symbols.

At this time, the primary synchronization signal sequence may be a Zadoff-Chu (ZC) sequence.

Also, the primary synchronization signal sequence may have a length determined based on a value of the K, a CP length included in the K OFDM symbols and the number of carriers into which the primary synchronization signal subsequences are mapped.

Also, the Nth primary synchronization signal subsequence may include a sample of a certain length from z(N) sample of the primary synchronization signal sequence, and a value of the z(N) may be determined by the following Equation 1:

$$z(N)=v(N)*12/128 \qquad \text{[Equation 1]}$$

where v(N) may indicate a length of symbols accumulated from the first OFDM symbol to the N−1th OFDM symbol among the K OFDM symbols and a CP length.

Preferably, the value of the z(N) may have a real number value.

Also, the primary synchronization signal subsequence may have a length based on the number of carriers into which the primary synchronization signal subsequences are mapped.

Also, mapping of the K primary synchronization signal subsequences into corresponding OFDM symbols may include performing DFT (Discrete Fourier Transform) computation for each of the K primary synchronization signal subsequences, mapping the primary synchronization signal subsequences, to which the DFT computation is applied, into one or more continuous carriers and performing IFFT (Inverse Fast Fourier Transform) computation, and adding CP to each OFDM symbol.

Also, phase may be compensated as much as a(N) for the Nth primary synchronization signal subsequence which is a sample of a certain length from z(N) sample of the primary synchronization signal sequence, and a value of z(N) may be determined by the following Equation 2, $$z(N)=v(N)*12/128,\qquad\text{[Equation 2]}$$

where v(N) indicates a length of symbols accumulated from the first OFDM symbol to the N−1th OFDM symbol among the K OFDM symbols and CP length, and a value of the a(N) may be determined by the following Equation 3, $$a(N)=\exp(-j2\pi f_x v(N)/128)\qquad\text{[Equation 3]}$$

where $f_x$ may indicate the lowest subcarrier index into which the Nth primary synchronization signal subsequence is mapped.

Also, mapping of the K primary synchronization signal subsequences into corresponding OFDM symbols may include performing DFT (Discrete Fourier Transform) computation for each of the K primary synchronization signal subsequences, fixedly mapping the primary synchronization signal subsequences, to which the DFT computation is applied, into subcarrier indexes 0 to 11 of corresponding OFDM symbols and performing IFFT (Inverse Fast Fourier Transform) computation, and adding CP to each OFDM symbol, and transmission of the primary synchronization signal mapped into the K OFDM symbols includes transmitting the primary synchronization signal by applying phase rotation to the primary synchronization signal mapped into the K OFDM symbols.

It is to be understood that both the foregoing general description and the following detailed description of the present disclosure are exemplary and explanatory and are intended to provide further explanation of the disclosure as claimed.

Advantageous Effects

Accordingly, the present disclosure provides the following effects and/or advantages.

First, data and/or control information for a narrowband Internet of things (NB-IoT) user equipment (UE) can be efficiently transmitted and received.

Secondly, as methods for generating a primary synchronization signal (PSS) and a secondary synchronization signal (SSS) used in an NB-IoT system are defined, an NB-IoT UE can efficiently acquire time and frequency synchronization even in an NB-IoT system.

Thirdly, a method for transmitting and receiving a primary synchronization signal at a narrow bandwidth applied to an NB-IoT system may be provided, whereby the UE may synchronize with a base station.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE FOR CARRYING OUT THE INVENTION

Figure 1:
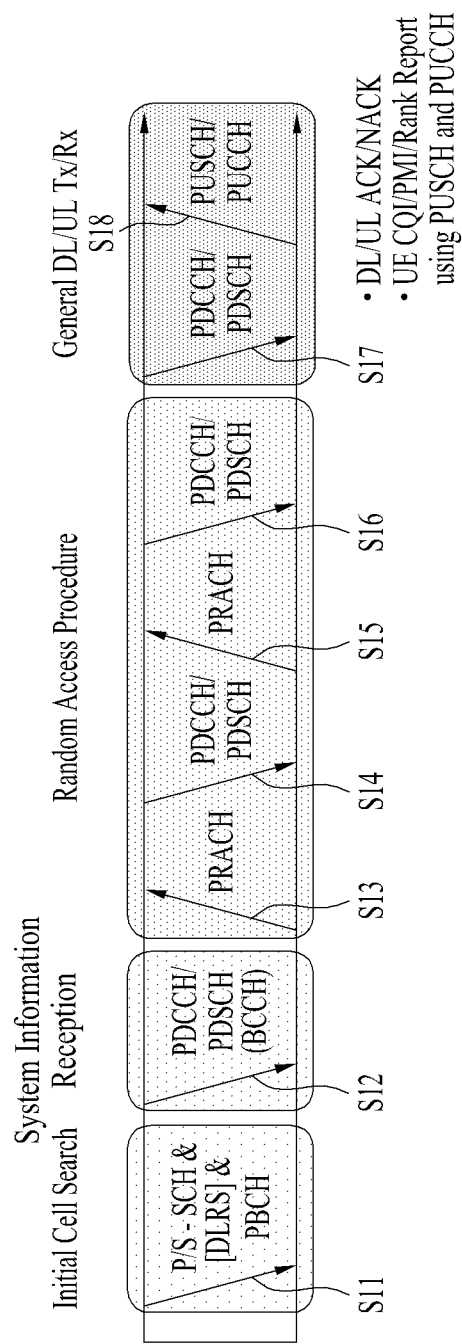
FIG. 1 is a view illustrating physical channels and a signal transmission method using the physical channels.

Hereinafter, the embodiments of the present invention described in detail relate to a wireless access system supporting a narrow band internet of things (NB-IoT), and provide a method for generating a synchronization signal and methods and apparatuses for transmitting and receiving a synchronization signal.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems are explained, which are examples of wireless access systems.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell identifier (ID) by receiving a primary synchronization channel (P-SCH) and a secondary synchronization channel (S-SCH) from the eNB.

Then the UE may acquire information broadcast in the cell by receiving a physical broadcast channel (PBCH) from the eNB.

During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH (S12).

To complete connection to the eNB, the UE may perform a random access procedure with the eNB (S13 to S16). In the random access procedure, the UE may transmit a preamble on a physical random access channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a physical uplink shared channel (PUSCH) and/or a physical uplink control channel (PUCCH) to the eNB (S18), in a general UL/DL signal transmission procedure.

Control information that the UE transmits to the eNB is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
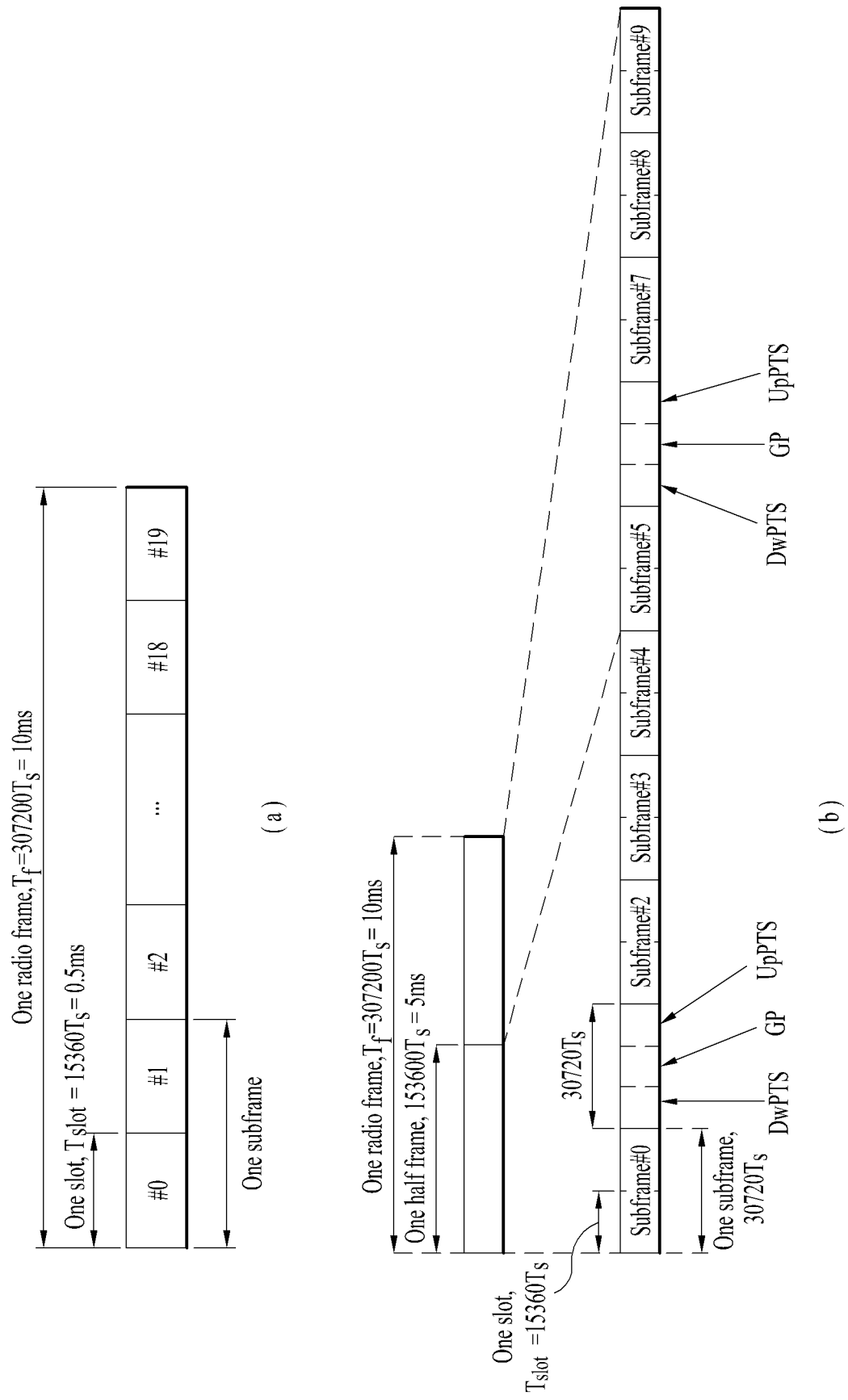
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full frequency division duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a transmission time interval (TTI). Ts is a sampling time given as Ts=1/(15 kHz×2048)=3.2552×10-8 (about 33 ns). One slot includes a plurality of orthogonal frequency division multiplexing (OFDM) symbols or SC-FDMA symbols in the time domain by a plurality of resource blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full duplex FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a time division duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, downlink pilot time slot (DwPTS), guard period (GP), and uplink pilot time slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Below table 1 lists special subframe configurations (DwPTS/GP/UpPTS lengths).

TABLE 1

| | | Normal cyclic prefix in downlink | | Extended cyclic prefix in downlink | | |
| --- | --- | --- | --- | --- | --- | --- |
| | | UpPTS | | | UpPTS | |
| | | Normal | Extended | | Normal cyclic | Extended cyclic |
| Special subframe configuration | DwPTS | cyclic prefix in uplink | cyclic prefix in uplink | DwPTS | prefix in uplink | prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
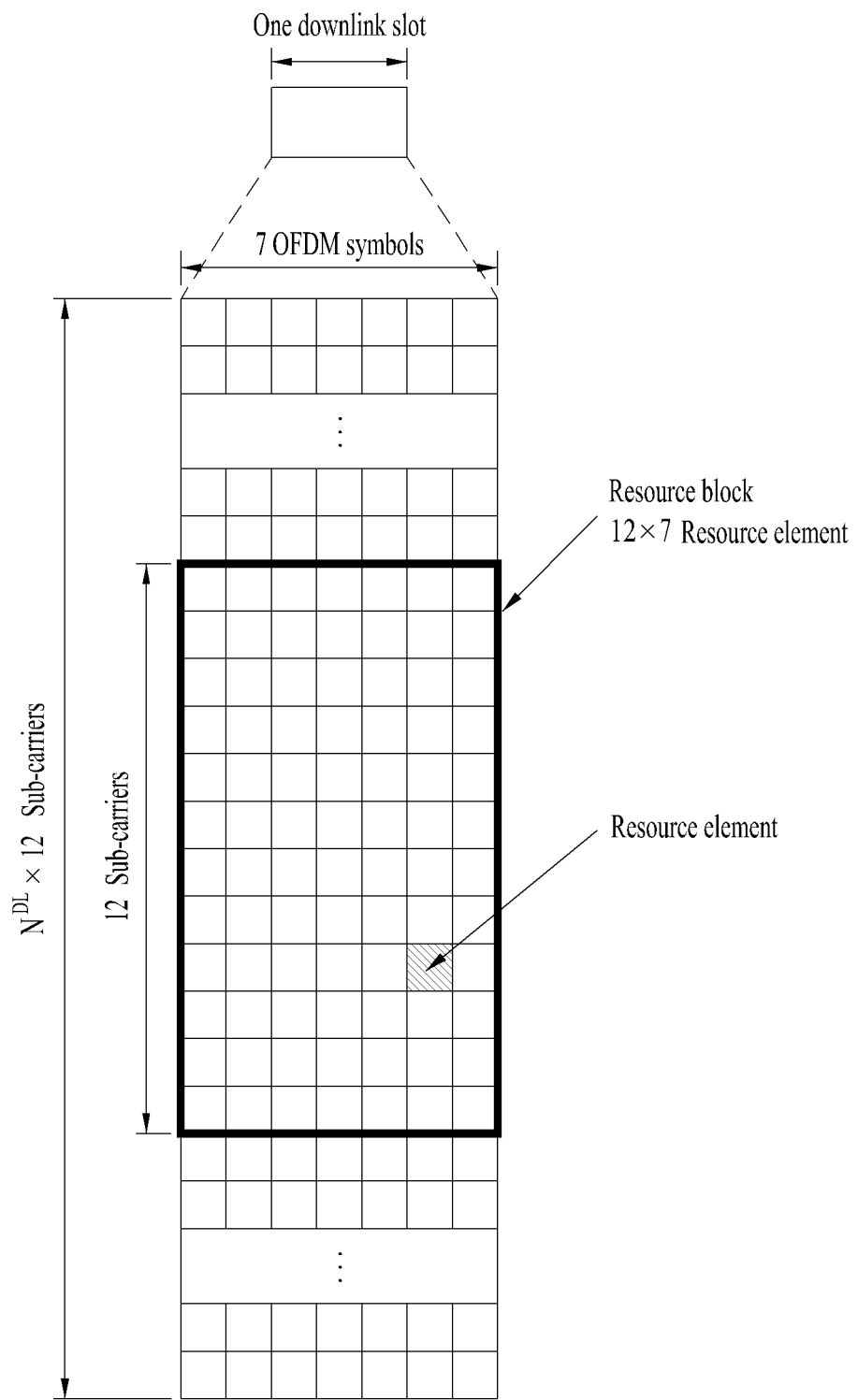
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a resource element (RE). An RB includes 12×7 REs. The number of RBs in a DL slot, NDL depends on a DL transmission bandwidth. A UL slot may have the same structure as a DL slot.

1.3 Synchronization Signal

A synchronization signal (SS) includes a primary synchronization signal (PSS) and a secondary synchronization signal (SSS). The SS is a signal used for establishing synchronization between a UE and an eNB and performing cell search.

Figure 4:
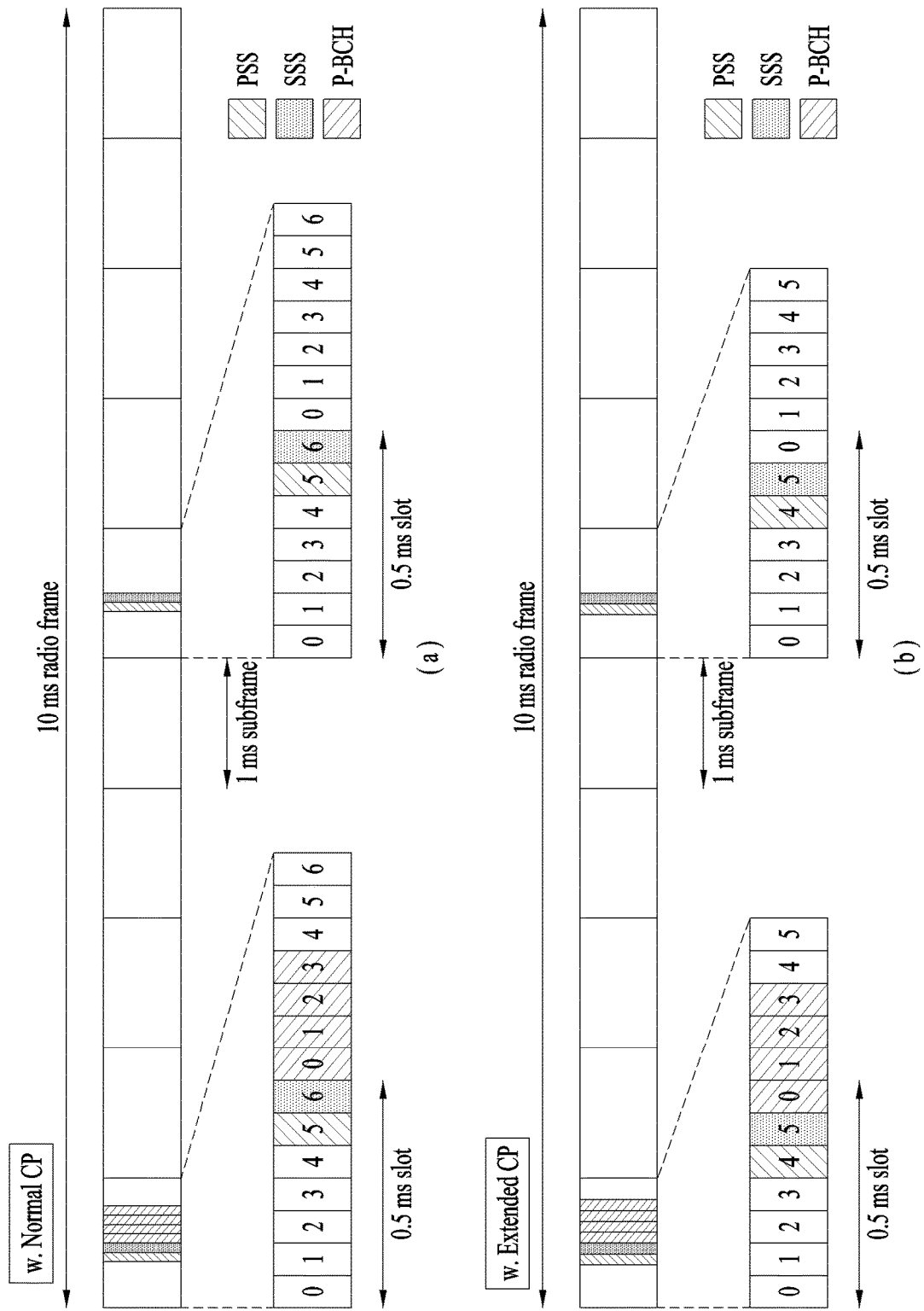
FIG. 4 is a view illustrating an exemplary frame structure showing a position for transmitting a synchronization signal.

FIG. 4 is a view illustrating an exemplary frame structure showing a position for transmitting a synchronization signal. In particular, FIG. 4(a) shows a frame structure for SS transmission in a system using a Cyclic Prefix (CP), and FIG. 4(b) shows a frame structure for SS transmission in a system using an extended CP.

The SS is transmitted in a second slot in each of subframe 0 and subframe 5 in consideration of a GSM frame length of 4.6 ms for facilitation of inter-Radio Access Technology (inter-RAT) measurement. In this case, boundaries of a corresponding radio frame may be detected through the SSS.

Referring to FIG. 4(a) and FIG. 4(b), the PSS is transmitted in the last OFDM symbol of each of slot 0 and slot 5, and the SSS is transmitted in an OFDM symbol immediately before the OFDM symbol in which the PSS is transmitted. The SS can carry total 504 physical layer cell IDs (physical cell IDs) through combinations of 3 PSSs and 168 SSSs. In addition, the SS and a PBCH are transmitted within 6 RBs in the middle of the system bandwidth, and thus a UE can detect or decode the SS and PBCH irrespective of a transmission bandwidth size.

A transmission diversity scheme for the SS uses a single antenna port only. That is, a single antenna transmission scheme or a transmission scheme transparent to a UE (e.g., PVS, TSTD, CDD, etc.) may be used.

1.3.1 Primary Synchronization Signal (PSS)

A Zadoff-Chu (ZC) sequence of length 63 is defined in the frequency domain and the sequence is used as a sequence for the PSS. The ZC sequence can be defined according to Equation 1.

$$d_u(n) = e^{-j\frac{\pi u n(n+1)}{N_{ZC}}}$$ [Equation 1]

In Equation 1, NZC indicates the length of the ZC sequence, 63 and du(n) indicates the PSS sequence in accordance with a root index, u. In this case, a sequence element corresponding to a direct current (DC) subcarrier, n=31 is punctured.

In order to facilitate designing a filter for performing synchronization, 9 remaining subcarriers among 6 RBs (i.e., 72 subcarriers) in the middle of the bandwidth are always set to 0 and then transmitted. To define total 3 PSSs, u may have the values of 25, 29 and 34 in Equation 2 (i.e., u=25, 29 and 34). In this case, since u=29 and u=34 are in a conjugate symmetry relation, two correlations may be simultaneously performed. Here, the conjugate symmetry means a relation in Equation 2 below. A one-shot correlator for u=29 and u=34 can be implemented using conjugate symmetry characteristics, and the total amount of calculation can be reduced by about 33.3%.

$$d_u(n) = (-1)^n (d_{N_{ZC}-u}(n))^*, \text{ when } N_{ZC} \text{ is even number.}$$

$$d_u(n) = (d_{N_{ZC}-u}(n))^*, \text{ when } N_{ZC} \text{ is odd number.}$$ [Equation 2]

1.3.2 Secondary Synchronization Signal (SSS)

The SSS is generated by interleaving and concatenating two m-sequences each of length 31. In this case, 168 cell group IDs can be distinguished by combining the two sequences. As a sequence for the SSS, the m-sequence has a robust property in a frequency-selective environment. In addition, the amount of calculation can be reduced by applying high-speed m-sequence transformation using Fast Hadamard Transform. Moreover, to reduce the amount of calculation of a UE, it is proposed that the SSS is composed of two short codes.

Figure 5:
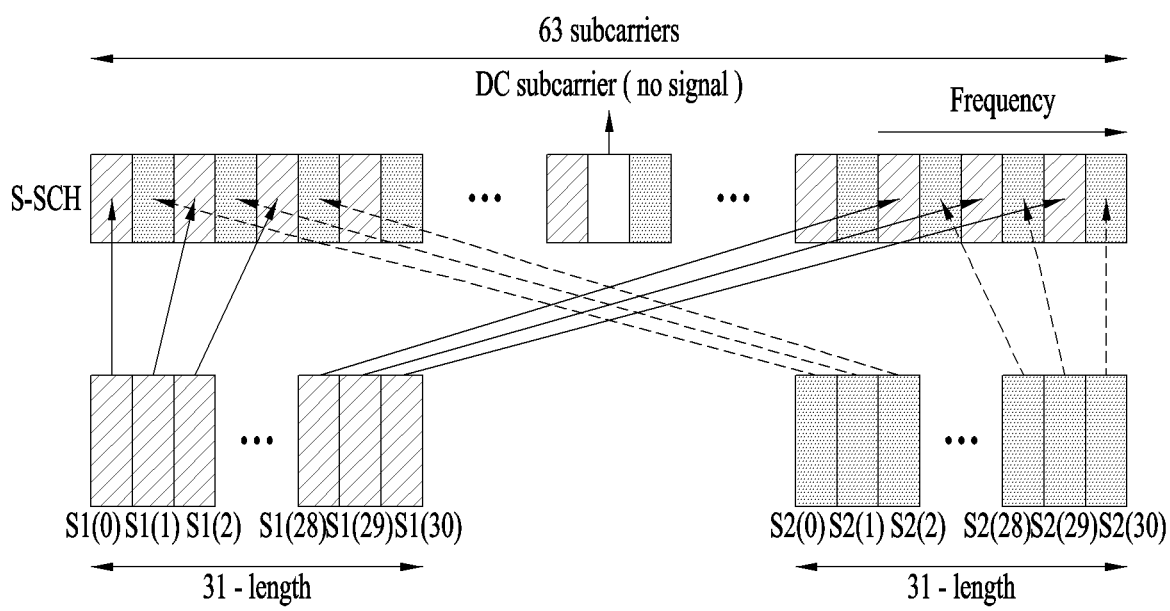
FIG. 5 is a view illustrating a method for generating a secondary synchronization signal (SSS)

FIG. 5 is a view illustrating a method for generating a secondary synchronization signal.

Referring to FIG. 5, it can be seen that two sequences defined in the logical domain are interleaved and mapped in the physical domain. For example, two m-sequences used for generating an SSS code may be respectively defined as S1 and S2. In this case, if an SSS in subframe index 0 carries a cell group ID through a combination of (S1, S2) and an SSS in subframe index 5 is transmitted by being swapped as (S2, S1), it is possible to distinguish between boundaries of a 10 ms frame. In this case, a generation polynomial of x5+x2+1 may be used for the SSS code, and total 31 codes may be generated through different circular shifts.

In order to improve reception performance, two different PSS-based sequences are defined and scrambled into the SSS. In this case, scrambling may be performed on S1 and S2 using different sequences. Thereafter, an S1-based scrambling code is defined, and then scrambling is performed on S2. In this case, the SSS code is swapped every 5 ms but a PSS-based scrambling code is not swapped. The PSS-based scrambling code is defined based on an m-sequence generated from the generation polynomial of x5+x2+1 by applying six cyclic shift schemes according to PSS indices, and S1-based scrambling code is defined based on an m-sequence generated from a polynomial of x5+x4+x2+x1+1 as eight cyclic shift versions according to S1 indices.

2. Narrowband Internet of Things (NB-IoT)

2.1 NB-IoT Overview

The narrowband (NB) LTE is a system for supporting low complexity and power consumption using a system bandwidth corresponding to one PRB (i.e., 180 kHz), which is defined in the LTE system. As a communication scheme, the NB LTE can be used to implement IoT by supporting devices in a cellular system like machine-type communication (MTC). That is, the NB LTE system can be referred to as an NB-IoT system.

Since the NB-IoT system use the same OFDM parameters including subcarrier spacing as in the LTE system, one PRB in the legacy LTE band is allocated for the NB-LTE without additional allocation of bands. That is, the NB-IoT system has advantages in that frequencies can be efficiently used.

In the NB-LTE system, physical downlink channels are defined as an M-PSS/M-SSS, an M-PBCH, an M-PDCCH/M-EPDCCH, an M-PDSCH, etc. or an NB-PSS/NB-SSS, an NB-PBCH, an NB-PDCCH/NB-EPDDCH, an NB-PDSCH, etc. To distinguish the physical downlink channels of the NB-LTE system from physical channels of the LTE system, 'M-' or 'NB-' can be added.

The UE may acquire time and frequency synchronization by using a PSS even in the NB-IoT system, and the UE may detect cell ID by detecting SSS and acquire subframe index at which SSS is transmitted and other system information.

Embodiments of the present disclosure as described below relate to a PSS and an SSS which are applied to an NB-IoT system. Therefore, although NPSS, MPSS or NB-PSS is written shortly as PSS, the terms are interchangeably used in the same meaning. In addition, although NSSS, MSSS or NB-SSS is written shortly as SSS, the terms are interchangeably used in the same meaning.

Further, in embodiments of the present disclosure, one PRB includes a pair of RBs, for which the description of FIGS. 2 and 3 may be referred to. For example, one RB may include 7 OFDM symbols by 12 subcarriers.

Figure 6:
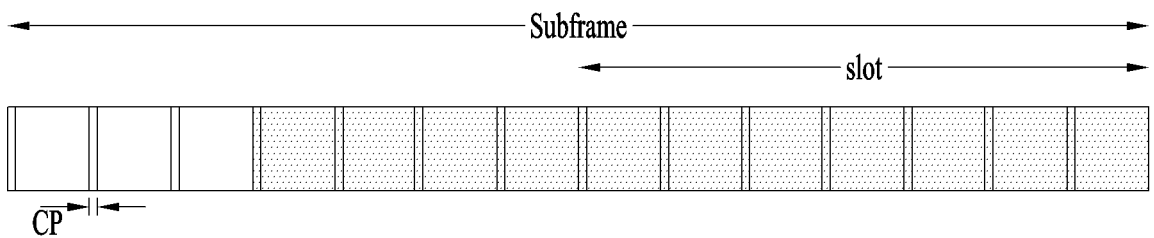
FIG. 6 is a view illustrating an example that N-PSS is transmitted from 11 OFDM symbols except a control channel region at one subframe in an LTE system of a normal CP.

The NB-IoT system should be designed such that N-PSS/N-SSS is transmitted at a BW corresponding to 1 PRB, that is, 180 kHz. Also, in order that the NB-IoT system is operated at in-band of the LTE system, a signal transmitted from the NB-IoT PRB should not give interference to the LTE system operated by a neighboring PRB. Therefore, the N-PSS/N-SSS may divisionally be transmitted to a plurality of OFDM symbols that include CP (Cyclic Prefix) as shown in FIG. 6. In this case, FIG. 6 illustrates an example that N-PSS is transmitted from 11 OFDM symbols except a control channel region at one subframe in the LTE system of normal CP.

Hereinafter, the present invention suggests a method for mapping N-PSS sequence into a plurality of OFDM symbols. As a main N-PSS sequence suggested in the present invention, Zadoff-Chu (ZC) sequence is considered but other sequence may be used. The Zadoff-Chu sequence may be expressed by the following Equation 3. In the Equation 3, N denotes a sequence length, and u denotes Zadoff-Chu root index.

$$c(n) = e^{-\frac{j\pi u n(n+1)}{N}}, n = \{0, 1, 2, \ldots, N-1\} \quad \text{[Equation 3]}$$

The Zadoff-Chu sequence has various properties, particularly has CAZAC (Constant Amplitude Zero Autocorrelation) property as a main property. In other words, the Zadoff-Chu sequence has a certain size and a side lobe of a self-correlation function, which is almost close to 0. In addition, although the Zadoff-Chu sequence has the other properties, properties useful for signal detection when the Zadoff-Chu sequence is used as a PSS signal are as follows.

First, a correlation function $f_o=k/N$ between a frequency shifted signal and an original signal of the Zadoff-Chu sequence is given by a time-shifted Dirac delta function. If the Zadoff-Chu sequence is frequency-shifted by Doppler offset as much as $f_o=k/N$, the frequency-shifted signal may be expressed by the following Equation 4.

$$c_f(n)=c(n)\exp(j2\pi f_o n) \quad \text{[Equation 4]}$$

The correlation function E(n) between the frequency-shifted signal $c_f(n)$ and the original signal c(n) may be expressed by the following Equation 5.

$$R(a) = \sum_{n=0}^{N-1} c_f(n+a)c^*(n) \approx N \cdot \delta(k-ua) \quad \text{[Equation 5]}$$

If the frequency-shifted PSS signal is detected by random Doppler offset based on the aforementioned properties, since signal detection is not performed for all applicable Doppler offsets, complexity of signal detection may be reduced.

Figure 7:
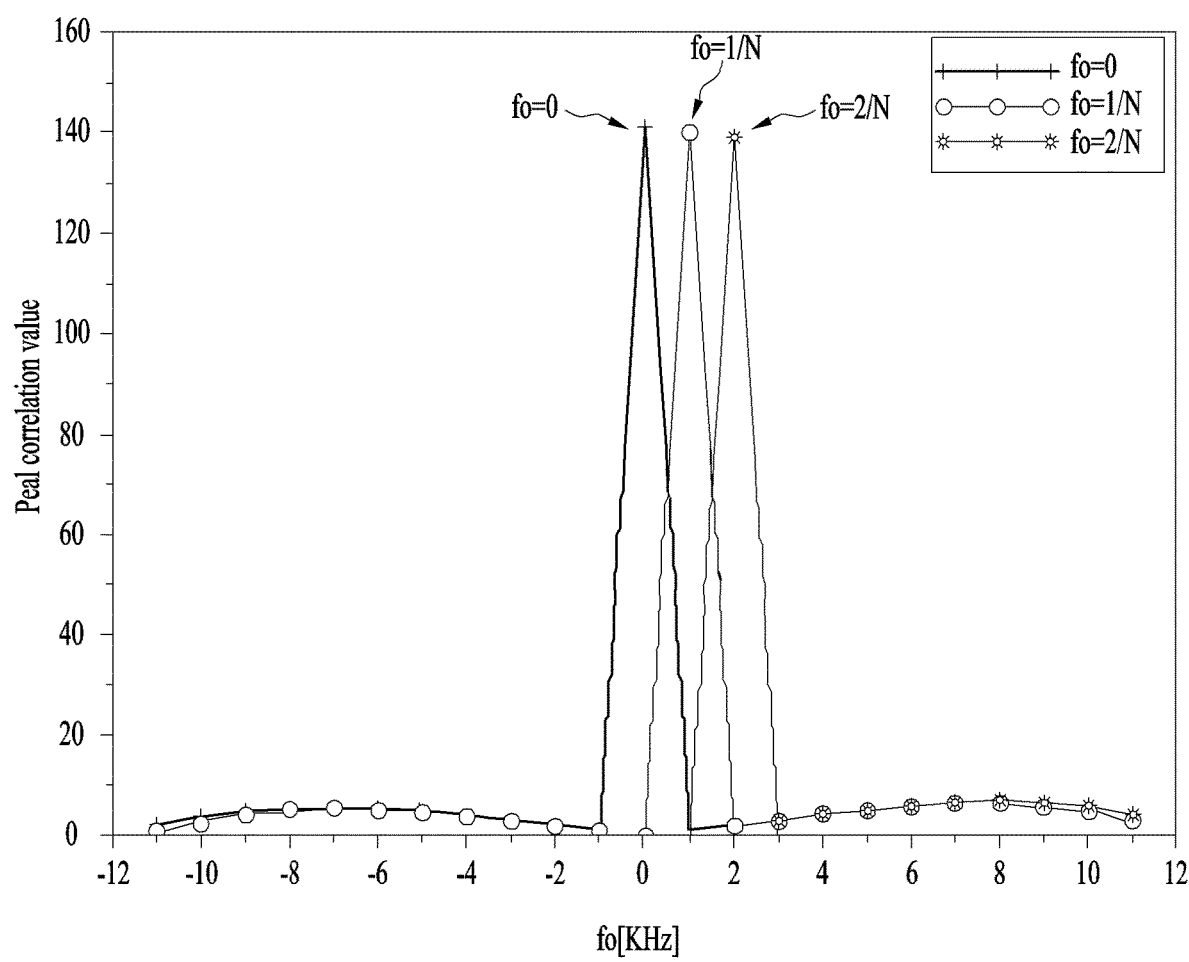
FIG. 7 is a view illustrating an output of a correlation function according to $f_o=k/N$ when a sequence length N is 141 and Zadoff-chu root index u is 1.

FIG. 7 is a view illustrating an output of a correlation function according to $f_o=k/N$ when a sequence length N is 141 and Zadoff-chu root index u is 1. As shown in FIG. 7, since the output of the correlation function denotes a certain value or more regardless of the value of Doppler offset, the UE may detect the PSS signal more easily.

Secondly, linear phase of (ua/N) may be increased as expressed in Equation 6 due to phase difference of two samples having a random time difference. This may equally be applied to the frequency-shifted signal $c_f(n)$.

$$c(n)c^*(n+a) = c_f(n)c_f^*(n+a) = e^{-\frac{j\pi u(2an+a(a+1))}{N}} \quad \text{[Equation 6]}$$

For detection of the PSS signal using the aforementioned properties, differential detection or differential phase detection may be used, and a resultant signal differentially detected by a sample interval a becomes a tone signal having a frequency component of (ua/N).

As one embodiment of the present invention, a method for transmitting the following two Zadoff-Chu sequences having a conjugate relation as an N-PSS signal may be considered.

$$c_1(n) = e^{-\frac{j\pi u n(n+1)}{N}}, n = \{0, 1, 2, \ldots, N-1\} \quad \text{[Equation 7]}$$
$$c_2(n) = e^{\frac{j\pi u n(n+1)}{N}}, n = \{0, 1, 2, \ldots, N-1\}$$

That is, configuration may be made based on that $c_1(n)$ is transmitted at a time period $t_1$, and $c_2(n)$ is transmitted at a time period $t_2$. At this time, if frequency is shifted by Doppler offset as much as $f_o=k/N$, the received signal may be expressed as follows.

$$c_f(n)=c_1(n-t_1)\exp(j2\pi f_o n)+c_2(n-t_2)\exp(j2\pi f_o n) \quad \text{[Equation 8]}$$

In this case, a correlation function $R_i(n)$ between the received signal $c_f(n)$ and the original signal $R_i(n)$ may be expressed as follows.

$$R_2(a)=N \cdot \delta(k+u(a-t_2)) \quad \text{[Equation 9]}$$

As expressed in the Equation 9, $R_q(n)$ may have a peak (or the highest output value) at a time period $(t_1+k/u)$, and $R_2(n)$ may have a peak at a time period $(t_2-k/u)$. In this way, Doppler offset k may be estimated through a time difference of peak outputs of two correlators.

3. Method Suggested in the Present Invention

Hereinafter, the present invention suggests a detailed method for mapping N-PSS sequence into a plurality of OFDM symbols based on Zadoff-Chu sequence having the aforementioned properties and transmitting the mapped N-PSS.

3-1. The First Embodiment

This embodiment suggests a method for generating N-PSS sequence of L=S*K length to map the N-PSS sequence into S subcarriers within K OFDM symbols and mapping sub-sequence obtained by identifying some of the generated N-PSS sequence every S length into a carrier on each OFDM symbol.

Hereinafter, a detailed method for mapping N-PSS sequence into 12 carriers within K OFDM symbols will be described. However, the number S of carriers into which the N-PSS sequence is mapped may be varied depending on the embodiment. Therefore, for convenience of description, the embodiment of the present invention will be described in detail based on that the number of variable carriers into which N-PSS sequence is mapped is expressed as 12'.

Therefore, in the present invention, N-PSS sequence of L=12'*K length is generated to be mapped into 12' carriers within K OFDM symbols, and N-PSS subsequences obtained by identifying some of the generated N-PSS sequence every 12' length may be mapped into carrier on each OFDM symbol. As a detailed example, in this suggested method, N-PSS sequence c(n) is indexed from 0 such that c(0), . . . c(11) may be mapped into the first OFDM symbol and c(12), . . . c(23) may be mapped into the second OFDM symbol. In this way, the N-PSS sequence of 12'*K length may sequentially be mapped into K OFDM symbols.

In this case, as a mapping method into each OFDM symbol, an OFDM transmission method for directly mapping N-PSS sequence to subcarriers of allocated PRB may be used, or an SC-OFDM transmission method for performing DFT (Discrete Fourier Transform) for the N-PSS sequence of a length 12' and mapping the transformed resultant value into subcarriers of allocated PRB may be used.

Figure 8:
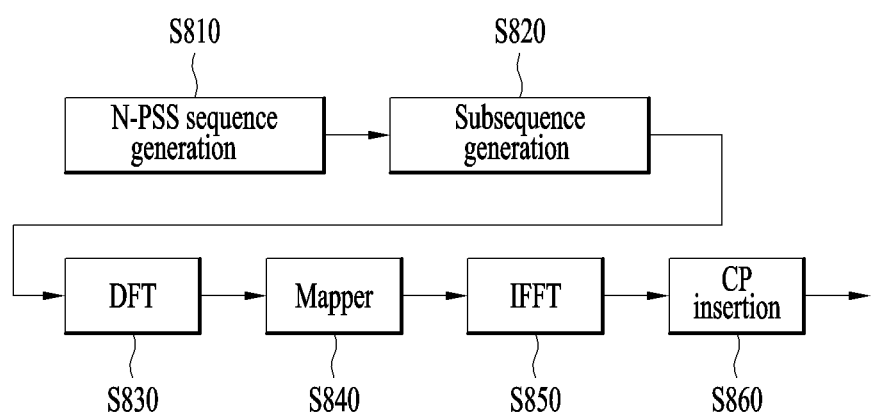
FIG. 8 is a view briefly illustrating a method for generating N-PSS signal according to one embodiment of the present invention.

FIG. 8 is a view briefly illustrating a method for generating N-PSS signal according to one embodiment of the present invention. In detail, FIG. 8 illustrates a method for generating N-PSS signal, to which the SC-OFDM transmission method is applied.

As shown in FIG. 8, according to the method for generating N-PSS signal, which is suggested in the present invention, after N-PSS sequence of a length L is generated (S810) and subsequences of a length 12', which will be transmitted to each OFDM symbol interval, are generated (S820), DFT is applied to the generated subsequences (S830). Subsequently, the DFT resultant value is mapped into subcarriers within allocated PRB (e.g.: PRB of NB-IoT) (S840), IFFT (Inverse Fast Fourier Transform) is applied to the resultant value (S850), and CP (Cyclic Prefix) is added (S860), whereby a final Tx signal may be generated.

3-2. Second Embodiment

According to the first embodiment as above, CP of a length p is inserted during over-sampling of N-PSS sequence of 180 kHz to a final Tx signal of 1.92 MHz, whereby a sequence of (12*K/180000)=0.733 msec length is transformed to a Tx signal of (128+p)*K/1920000=0.785 msec length in case of K=11. The Tx signal transformed as above may be interpreted equally to the case that CP of 12'*p/128 is inserted every 12' interval of the N-PSS sequence.

However, in the above case, a phase increase value between respective samples of transmission signals having a random time difference may be varied depending on the presence of CP between the two samples. In other words, if N-PSS sequence is applied to Chadoff-Chu sequence, properties of the Equation 4 may be distorted, whereby detection reliability of the N-PSS sequence may be lowered.

Therefore, to solve the above problem, the second embodiment suggests a method for setting N-PSS sequence mapped into each OFDM symbol using N-PSS sequence of $180*(128+p)*10^3/1920$ length considering a time length of CP unlike the first embodiment.

In more detail, the second embodiment suggests a method for mapping subsequences of 12' length into the kth OFDM symbol by starting from the (z(k)=v(k)*12'/128)th sample of the N-PSS sequence if index of a start sample of the kth OFDM symbol is v(k). In this case, v(k) may indicate the same value as a CP length and symbol length accumulated to reach a previous symbol of the kth OFDM symbol among OFDM symbols into which the N-PSS sequence is mapped. At this time, if a calculation result of z(k)=(v(k)*12'/128) which is a start position of the N-PSS sequence is not an integer, computation of round, ceiling or floor is applied to the value of z(k), whereby the resultant value may be an integer. This mapping method is that the N-PSS sequence is over-sampled 128/12' times and some signal interval is replaced with CP, and is characterized in that property of the original N-PSS sequence may be maintained.

Table 2 illustrates each OFDM symbol at one subframe having normal CP in an LTE system and a CP length corresponding to each OFDM symbol. Also, Table 2 illustrates a start sample index of N-PSS sequence transmitted through each OFDM symbol calculated in accordance with the aforementioned Equation and a resultant value of computation of round, ceiling or floor applied to the start sample index if the N-PSS is transmitted from the other K (in this case, K=11) OFDM symbols except a control channel region. In Table 2, OFDM symbols from which transmission of the N-PSS starts are a total of 11 OFDM symbols from OFDM #3 (the fourth OFDM symbol), but may be varied depending on the embodiment.

TABLE 2

| OFDM symbol index | CP length | symbol length | Tx signal start sample index (v) | N-PSS sequence start sample index (z) | N-PSS sequence start sample index (ceiling) | N-PSS sequence start sample index (floor) | N-PSS sequence start sample index (round) |
|---|---|---|---|---|---|---|---|
| 0 | 10 | 128 | | | | | |
| 1 | 9 | 128 | | | | | |
| 2 | 9 | 128 | | | | | |
| 3 | 9 | 128 | 0 | 0.00 | 0 | 0 | 0 |
| 4 | 9 | 128 | 137 | 12.84 | 13 | 12 | 13 |
| 5 | 9 | 128 | 274 | 25.69 | 26 | 25 | 26 |
| 6 | 9 | 128 | 411 | 38.53 | 39 | 38 | 39 |
| 7 | 10 | 128 | 549 | 51.47 | 52 | 51 | 51 |
| 8 | 9 | 128 | 686 | 64.31 | 65 | 64 | 64 |
| 9 | 9 | 128 | 823 | 77.16 | 78 | 77 | 77 |
| 10 | 9 | 128 | 960 | 90.00 | 90 | 90 | 90 |

TABLE 2-continued

| OFDM symbol index | CP length | symbol length | Tx signal start sample index (v) | N-PSS sequence start sample index (z) | N-PSS sequence start sample index (ceiling) | N-PSS sequence start sample index (floor) | N-PSS sequence start sample index (round) |
|---|---|---|---|---|---|---|---|
| 11 | 9 | 128 | 1097 | 102.84 | 103 | 102 | 103 |
| 12 | 9 | 128 | 1234 | 115.69 | 116 | 115 | 116 |
| 13 | 9 | 128 | 1371 | 128.53 | 129 | 128 | 129 |

As illustrated in Table 2, a sample of N-PSS sequence, to which a start sample of subsequences transmitted from each OFDM symbol belongs, may be identified in accordance with the second embodiment of the present invention. In more detail, Table 2 illustrates a detailed resultant value depending on which computation of round, ceiling and floor is applied to use an index of a start sample of N-PSS sequence per OFDM symbol as an integer.

For example, referring to round computation, subsequences transmitted from OFDM symbol #4 start from a sample corresponding index=13 of the N-PSS sequence, and $c(13), \ldots c(24)$ of the N-PSS sequence may be mapped into the OFDM symbol #4. Therefore, the subsequences transmitted from the last OFDM symbol (that is, OFDM symbol #13) may start from a sample corresponding to index=129 of the N-PSS sequence, whereby $c(129), \ldots c(140)$ of the N-PSS sequence may be mapped into the last OFDM symbol.

As described above, Table 2 illustrates that the N-PSS sequence is mapped into 12 carriers within K (K=11) OFDM symbols, and if the N-PSS sequence is mapped into S carriers within K OFDM symbols, the aforementioned configuration may be modified to correspond to this case.

3-3. Third Embodiment

According to the second embodiment of the present invention, approximation computation may be applied to a procedure of calculating a start position of the N-PSS sequence mapped into each OFDM symbol, whereby a problem occurs in that the N-PSS signal which is finally transmitted distorts some of properties of Zadoff-Chu sequence.

To solve this problem, the third embodiment of the present invention suggests a method for applying a real number not an integer as a value applicable to n of the Zadoff-Chu sequence generation Equation of the Equation 3. In other words, the third embodiment suggests a method for applying a start position (or start sample index) of the N-PSS sequence mapped into each OFDM symbol as a real number.

Hereinafter, for convenience of description, a detailed configuration for transmitting N-PSS through 12 carriers within 11 OFDM symbols will be described but the third embodiment of the present invention may be applied to a configuration for transmitting N-PSS through S carriers within K OFDM symbols. Therefore, for convenience of description, the embodiment of the present invention will be described in detail based on that the number of variable carriers into which N-PSS sequence is mapped is expressed as 12'.

Therefore, in the third embodiment of the present invention, if the N-PSS sequence is mapped into 12' carriers within each OFDM symbol, N-PSS sequences $c(z)$, $c(z+1), \ldots, c(z+11)$ are mapped into each OFDM symbol, and a real number value may be applied as the value of z. In this case, values of z applied to each OFDM symbol are different from each other, preferably a value of z corresponding to N-PSS sequence start sample index of Table 2 may be used.

When the third embodiment of the present invention is expressed as the Equation, the method for generating N-PSS sequence mapped into each OFDM symbol in accordance with the Equation 10 may be applied to the third embodiment.

$$c(n) = e^{-\frac{j\pi u(n+z(l))(n+z(l)+1)}{N}}, \quad \text{[Equation 10]}$$

$n=\{0, 1, 2, \ldots, 11\}$ $l=\{3, 4, \ldots, 13\}$

In this case, $z(l)$ means a value of z per OFDM symbol, and a value of l indicates index of each OFDM symbol. Also, as described above, N indicates a sequence length, and u indicates Zadoff-Chu root index.

Figure 9:
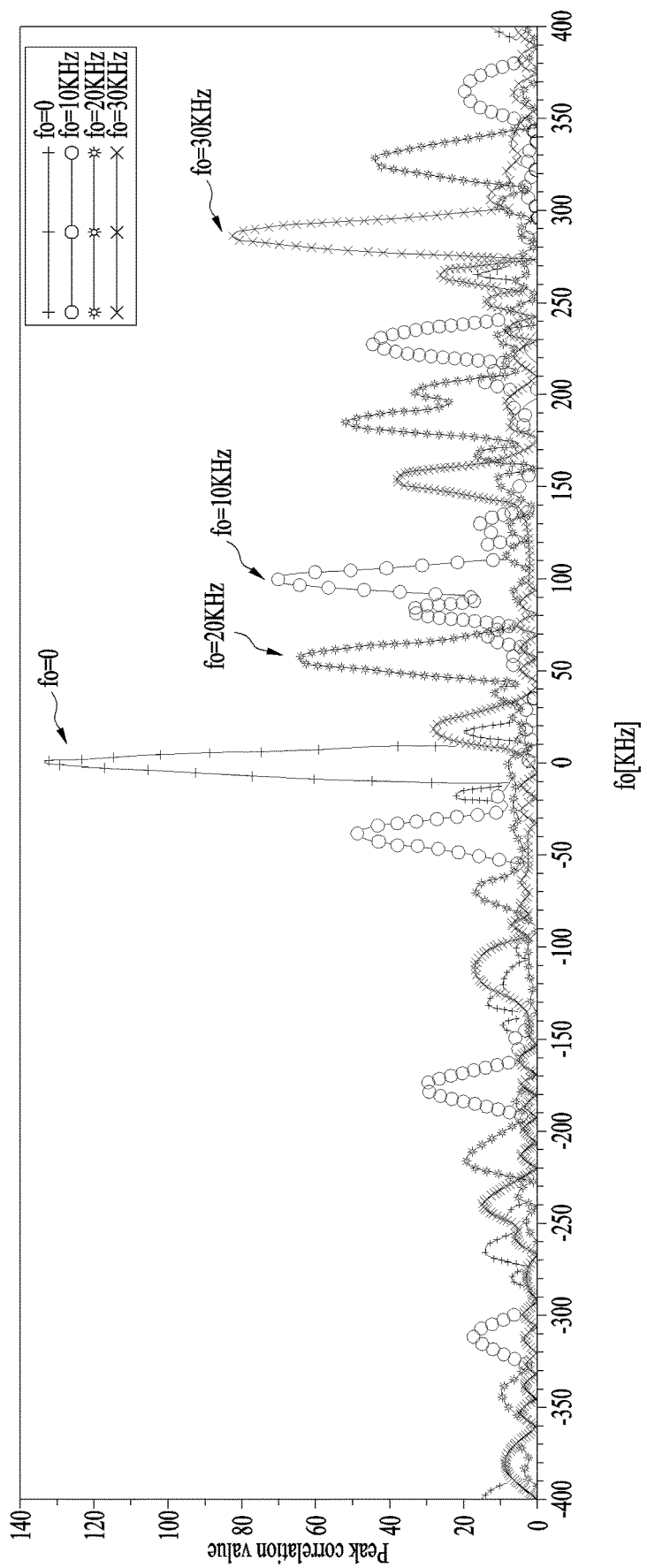
FIG. 9 is a view illustrating a correlation function of a PSS signal generated according to the first embodiment of the present invention.
Figure 10:
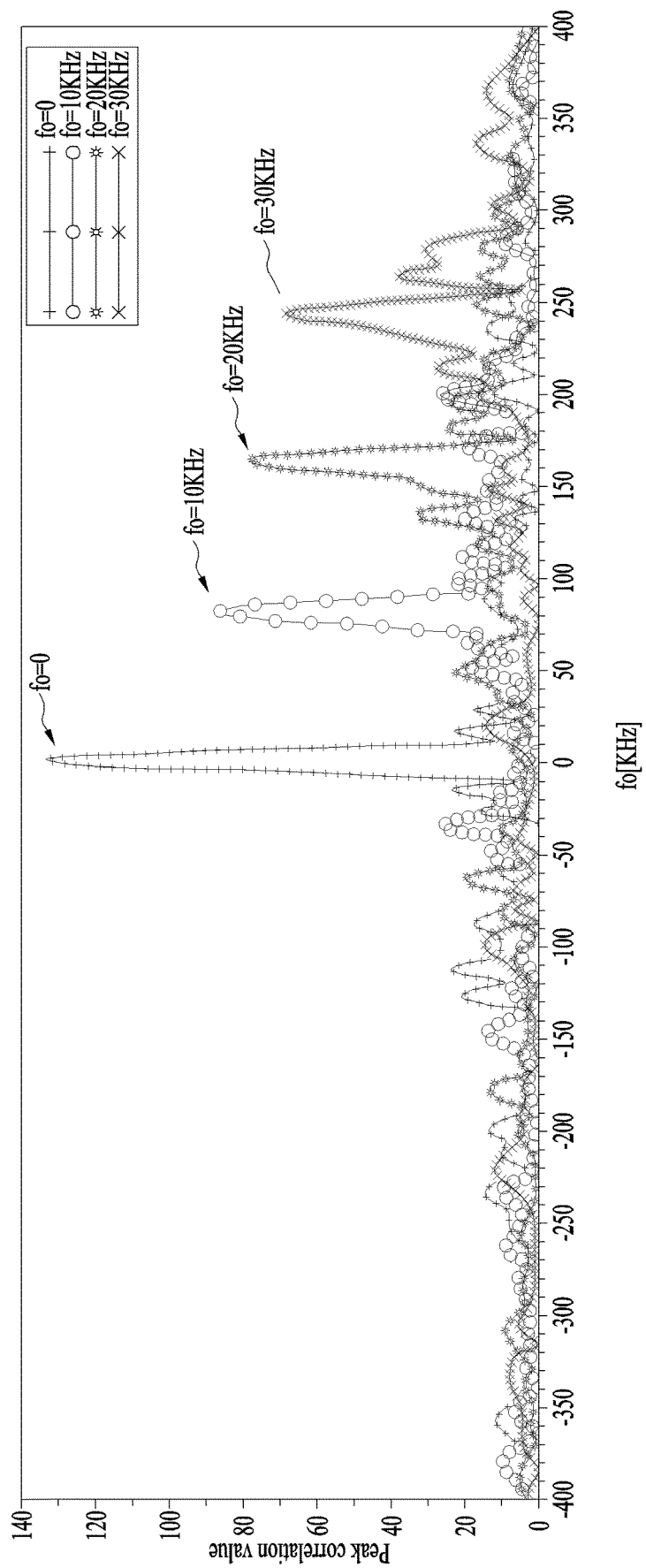
FIG. 10 is a view illustrating a correlation function of a PSS signal generated according to the second embodiment of the present invention.
Figure 11:
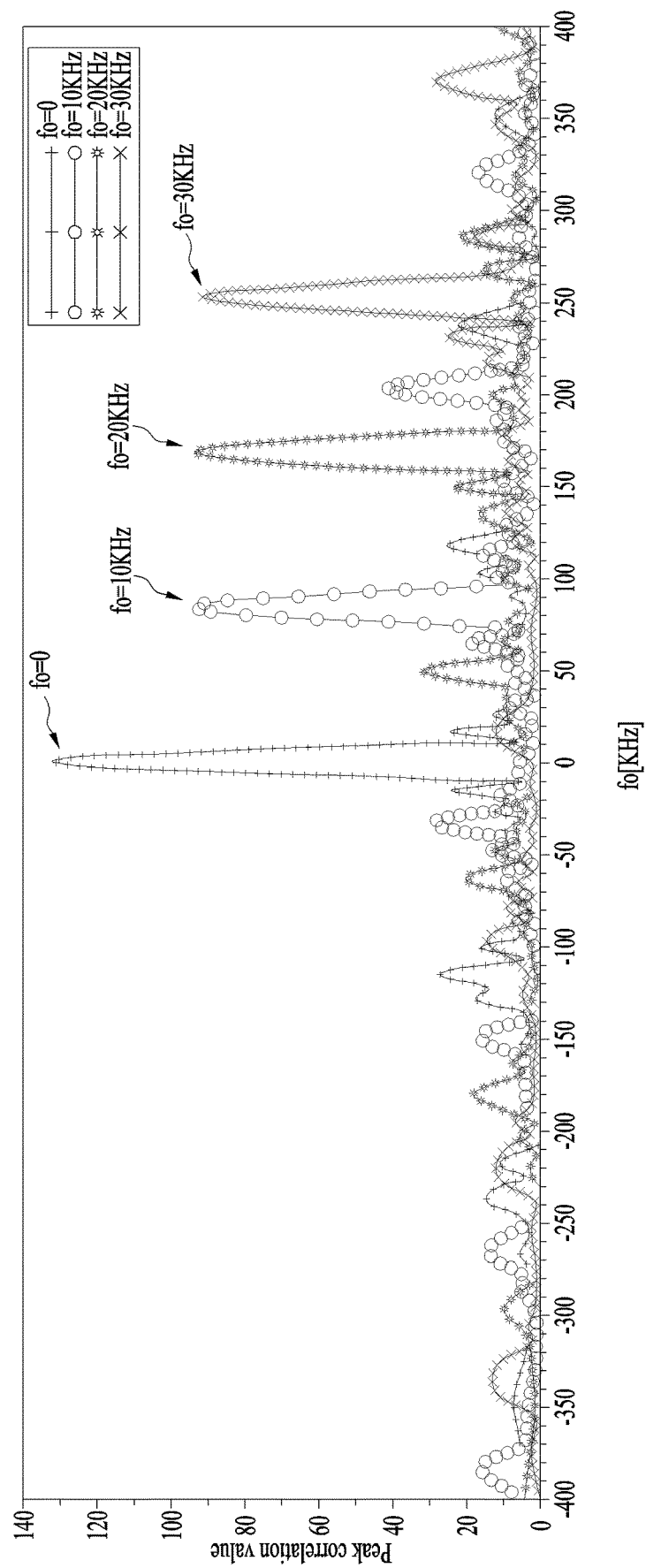
FIG. 11 is a view illustrating a correlation function of a PSS signal generated according to the third embodiment of the present invention.

FIGS. 9 to 11 are views illustrating a correlation function of N-PSS signal generated according to the first to third embodiments of the present invention. In this case, it is assumed that the N-PSS signal is generated at a sampling rate of 1.92 MHz.

As shown in FIGS. 9 and 10, it is noted from the N-PSS signal generated in accordance with the first embodiment of FIG. 9 that a peak value of the correlation function in the case that frequency offset exists becomes smaller than the case that there is no frequency offset. Also, it is noted from the N-PSS signal generated in accordance with the second embodiment of FIG. 10 that a peak value of the correlation function when frequency offset reaches a certain value or more becomes smaller than the case that there is no frequency offset.

On the other hand, it is noted from the N-PSS signal generated in accordance with the third embodiment of FIG. 11 that a peak value of the correlation function is uniformly maintained regardless of a frequency offset value. Based on this property, the UE may receive a PSS signal frequency shifted by Doppler offset and detect a PSS signal as a peak value of the correlation function exists at a specific time even though there is a difference between a reference PSS signal of a receiver and frequency as much as 30 kHz.

Figure 12:
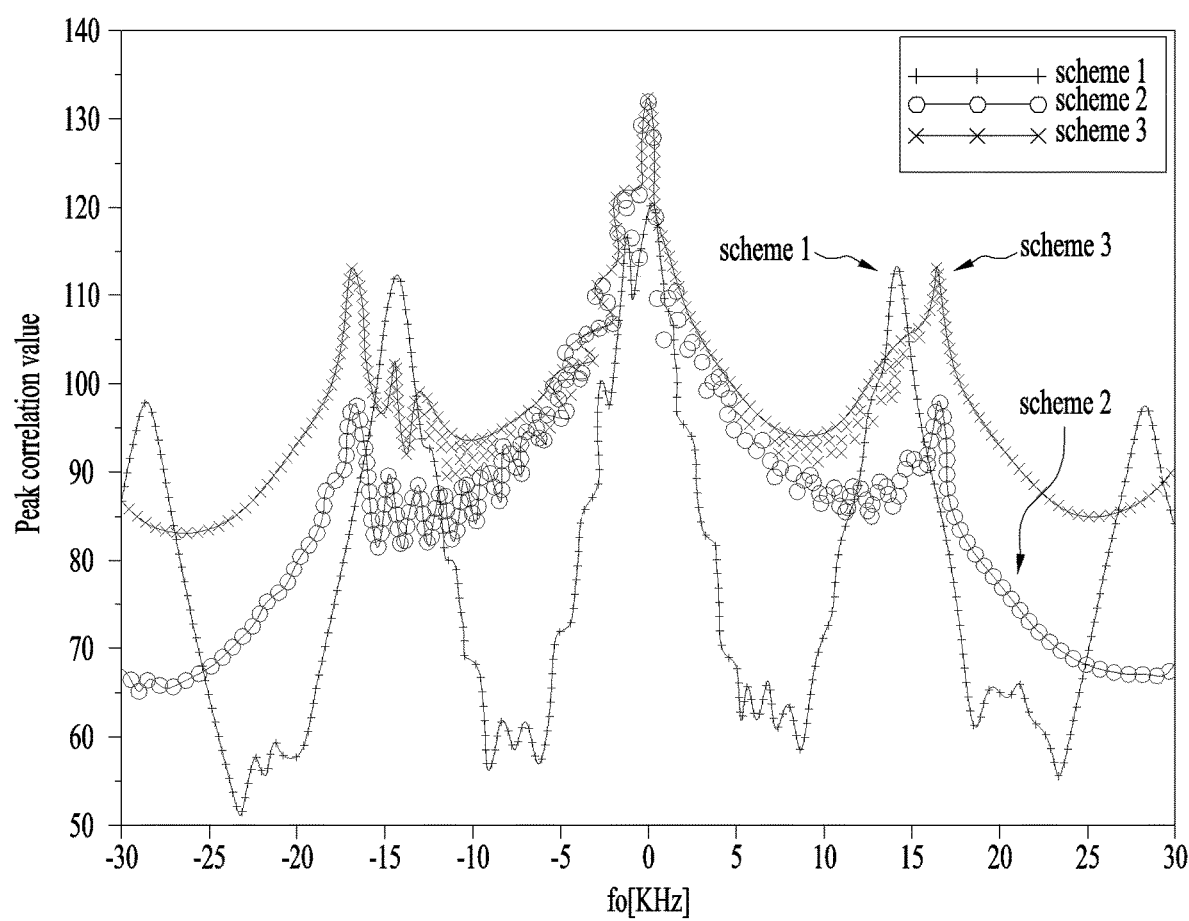
FIG. 12 is a view illustrating a change of a peak value of a correlation function when frequency offset is given at a frequency interval of 200 Hz in accordance with the first to third embodiments of the present invention.
Figure 13:
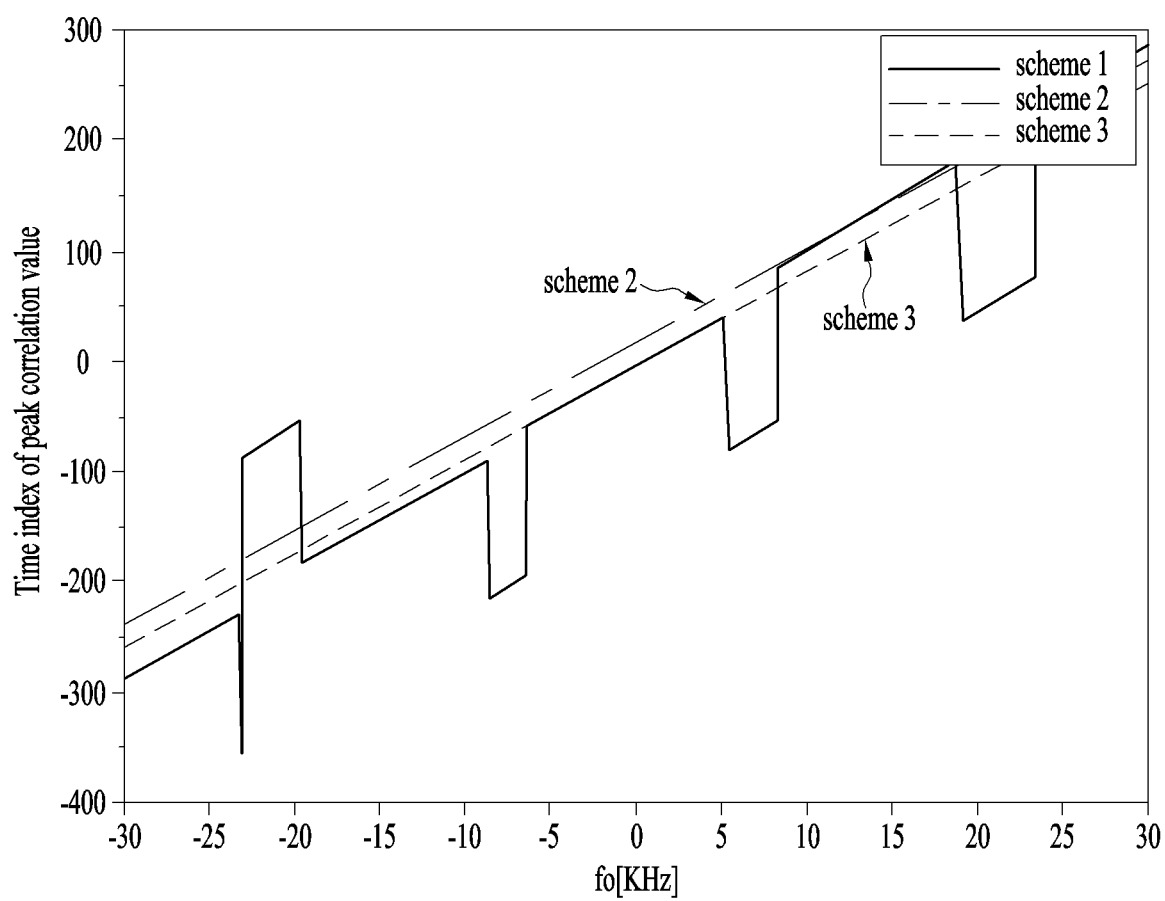
FIG. 13 is a view illustrating a time that a correlation function value of a PSS signal per frequency offset is a maximum value in accordance with the first to third embodiments of the present invention.

FIG. 12 is a view illustrating a change of a peak value of a correlation function when frequency offset is given at a frequency interval of 200 Hz in accordance with the first to third embodiments of the present invention, and FIG. 13 is a view illustrating a time that a correlation function value of a PSS signal per frequency offset is a maximum value in accordance with the first to third embodiments of the present invention.

In FIG. 12, it is noted from the method for generating N-PSS in accordance with the third embodiment that a peak value of the correlation function is high in accordance with all frequency offset values.

3-4. Fourth Embodiment

Correlation properties of FIGS. 12 and 13 are useful only if DFT sequence is mapped into subcarrier indexes 0 to 11. This is because that phase rotation is not maintained for total 11 OFDM symbols to which N-PSS signal is transmitted due to CP addition after IFFT. Mapping of N-PSS subsequences subjected to DFT into subcarrier index $f_x$ means that a Tx signal is phase rotated at $\exp(j2\pi f_x n/128)$ in accordance with time. That is, as CP is added, phase increase between samples fails to maintain a certain value at an OFDM symbol boundary.

Therefore, to solve the problem that CP is added and phase rotation is not uniform, in the fourth embodiment of the present invention, phase compensation may be performed by multiplying N-PSS subsequences transmitted from each OFDM symbol by a value of a(l) of Equation 11. In this case, w(l) indicates a value corresponding to an accumulated CP length, and $f_x$ indicates the lowest subcarrier index into which DFT subsequences are mapped.

$$a(l) = \exp(-j2\pi f_x w(l)/128), \, l = \{3, 4, \ldots, 13\} \quad \text{[Equation 11]}$$

If the fourth embodiment is applied to the third embodiment, the N-PSS subsequences mapped into each OFDM symbol may be expressed by the following Equation 12.

$$c_l(n) = e^{-\frac{j\pi u(n+z(l))(n+z(l)+1)}{N}} e^{\left(-\frac{j2\pi f_x w(l)}{128}\right)}, \quad \text{[Equation 12]}$$

n={0, 1, 2, ..., 11}, l={3, 4, ..., 13}

3.5 Fifth Embodiment

Figure 14:
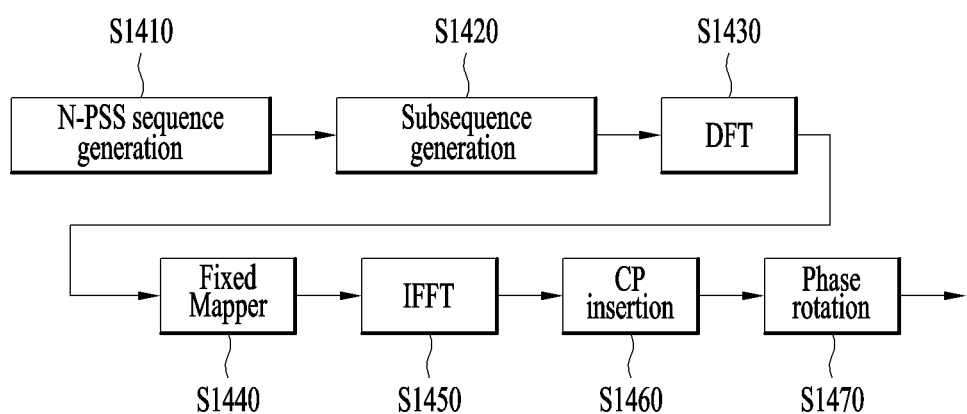
FIG. 14 is a view briefly illustrating a method for generating N-PSS signal in accordance with the fifth embodiment of the present invention.

FIG. 14 is a view briefly illustrating a method for generating N-PSS signal in accordance with the fifth embodiment of the present invention.

As shown in FIG. 14, in the fifth embodiment, resultant values of IFFT are mapped into each OFDM symbol and then phase rotation may be applied unlike the fourth embodiment. In more detail, in the fifth embodiment of the present invention, N-PSS sequence is generated in the same manner as the second embodiment or the third embodiment (S1410), and N-PSS subsequences corresponding to each OFDM symbol are generated from the N-PSS sequence (S1420). Subsequently, each of the N-PSS subsequences are subjected to DFT (S1430), and then fixedly mapped into subcarrier indexes 0 to 11 (S1440). After the N-PSS subsequences are subjected to IFFT (S1450) and CP is added (S1460), a transmission band of the N-PSS signal may be shifted using a phase rotator (S1470).

In other words, in the fifth embodiment of the present invention, the N-PSS sequence is mapped into a plurality of OFDM symbols in the same manner as the second embodiment or the third embodiment, and phase rotation is applied to the N-PSS sequence mapped into each OFDM symbol, whereby the transmission band of the N-PSS may be shifted.

The order of generating N-PSS according to the fifth embodiment of the present invention is partially different from the order of generating N-PSS according to the fourth embodiment but the finally generated N-PSSs are the same as each other.

4. Apparatuses

Figure 15:
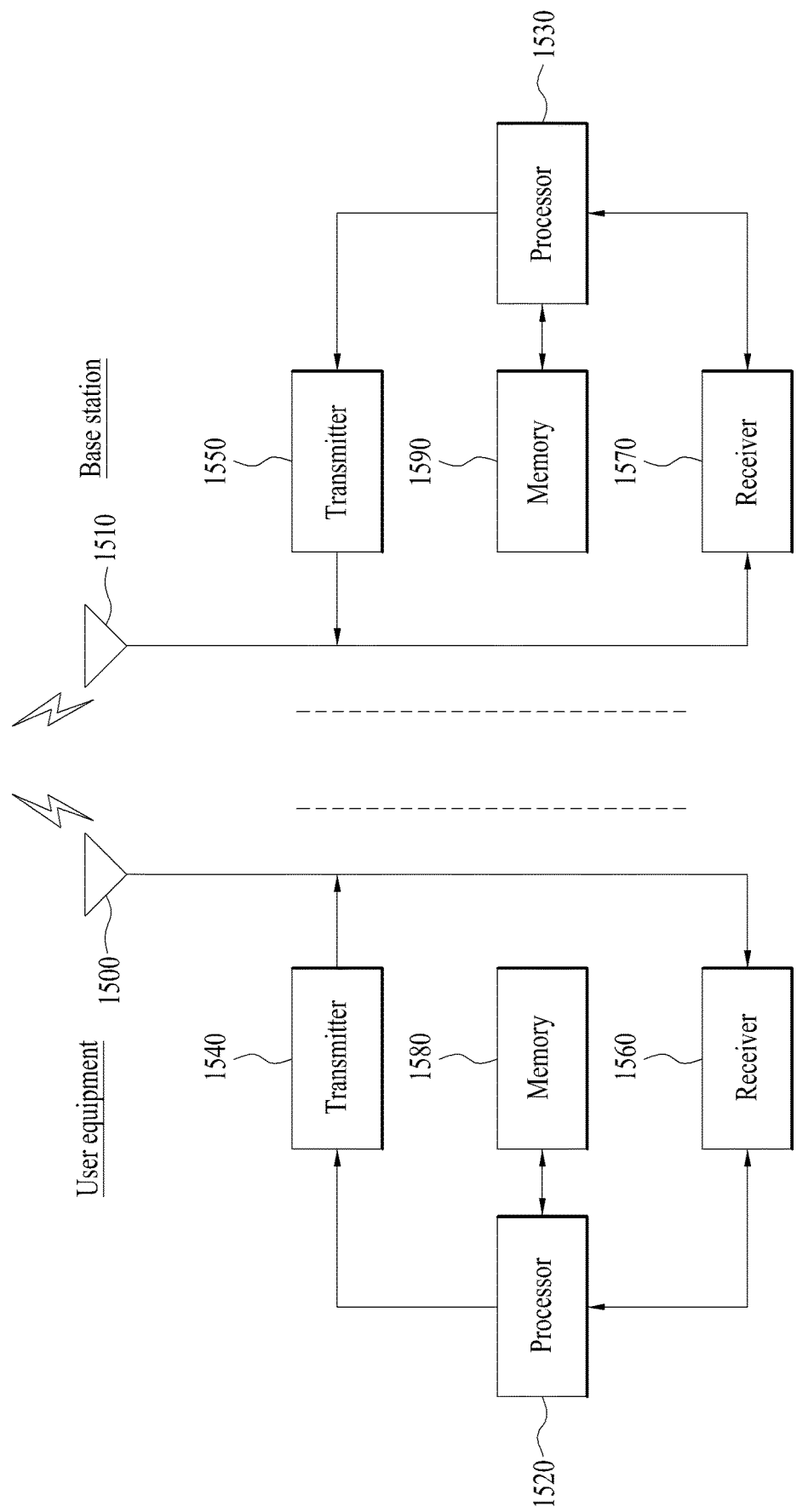
FIG. 15 is a view illustrating an apparatus through which methods described in FIGS. 1 to 14 may be implemented.

Apparatuses illustrated in FIG. 15 are means that can implement the methods described before with reference to FIGS. 1 to 14.

A UE may act as a transmission end on a UL and as a reception end on a DL. An eNB may act as a reception end on a UL and as a transmission end on a DL.

That is, each of the UE and the eNB may include a transmitter (Tx) 1540 or 1550 and a receiver (Rx) 1560 or 1570, for controlling transmission and reception of information, data, and/or messages, and an antenna 1500 or 1510 for transmitting and receiving information, data, and/or messages.

Each of the UE and the eNB may further include a processor 1520 or 1530 for implementing the afore-described embodiments of the present disclosure and a memory 1580 or 1590 for temporarily or permanently storing operations of the processor 1520 or 1530.

The embodiments of the present invention may be performed using the components and functions of the UE and the base station. For example, a base station for transmitting a primary synchronization signal (PSS) in a wireless access system supporting narrowband Internet of things (NB-IoT) may include a transmitter and a processor. At this time, the processor generates a primary synchronization sequence for being mapped into K (natural number which is K>1) OFDM (orthogonal Frequency Division Multiplexing) symbols, wherein the primary synchronization signal sequence may be generated considering a CP (Cyclic Prefix) length included in the K OFDM symbols. Also, the processor generates K primary synchronization signal subsequences respectively corresponding to the K OFDM symbols from the primary synchronization signal sequence, wherein the Nth primary synchronization signal subsequence mapped into the Nth (1≤N≤K) OFDM symbol among the K OFDM symbols may include a sequence of a certain length corresponding to the Nth OFDM symbol of the primary synchronization signal sequence. Also, the processor may be configured to respectively map the K primary synchronization signal subsequences into corresponding OFDM symbols and transmit the primary synchronization signal mapped into the K OFDM symbols. Additionally, the eNB may implement both the aforementioned method for generating N-PSS and the aforementioned method for transmitting the N-PSS in accordance with the embodiment of the present invention.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 15 may further include a low-power radio frequency (RF)/intermediate frequency (IF) module.

Meanwhile, the UE may be any of a Personal Digital Assistant (PDA), a cellular phone, a personal communication service (PCS) phone, a global system for mobile (GSM) phone, a wideband code division multiple access (WCDMA) phone, a mobile broadband system (MBS) phone, a hand-held PC, a laptop PC, a smart phone, a multi mode-multi band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1580 or 1590 and executed by the processor 1520 or 1530. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for transmitting a primary synchronization signal (PSS) in a wireless access system, the method comprising:

generating a primary synchronization signal sequence for being mapped into K OFDM (orthogonal Frequency Division Multiplexing) symbols, where K is a natural number larger than 1, wherein the primary synchronization signal sequence is generated considering a CP (Cyclic Prefix) length included in the K OFDM symbols;

generating K primary synchronization signal subsequences respectively corresponding to the K OFDM symbols from the primary synchronization signal sequence, wherein a Nth primary synchronization signal subsequence mapped into the Nth (1≤N≤K) OFDM symbol among the K OFDM symbols includes a sequence of a certain length corresponding to the Nth OFDM symbol of the primary synchronization signal sequence;

respectively mapping the K primary synchronization signal subsequences to corresponding OFDM symbols; and transmitting the primary synchronization signal mapped into the K OFDM symbols, wherein a phase is compensated as much as a(N) for the Nth primary synchronization signal subsequence which is a sample of a certain length from z(N) sample of the primary synchronization signal sequence, and a value of the z(N) is determined by the following Equation 1, $$z(N)=v(N)*12/128,\qquad\text{[Equation 1]}$$

where v(N) indicates a length of symbols accumulated from a first OFDM symbol to the (N−1)th OFDM symbol among the K OFDM symbols and CP length, and a value of the a(N) is determined by the following Equation 2, $$a(N)=\exp(-j2\pi f_x v(N)/128),\qquad\text{[Equation 2]}$$

where $f_x$ indicates a lowest subcarrier index into which the Nth primary synchronization signal subsequence is mapped.

2. The method according to claim 1, wherein the primary synchronization signal sequence is a Zadoff-Chu (ZC) sequence.

3. The method according to claim 1, wherein the primary synchronization signal sequence has a length determined based on a value of the K, a CP length included in the K OFDM symbols and the number of carriers into which the primary synchronization signal subsequences are mapped.

4. The method according to claim 1, wherein the value of the z(N) has a real number value.

5. The method according to claim 1, wherein the primary synchronization signal subsequence has a length based on the number of carriers into which the primary synchronization signal subsequences are mapped.

6. The method according to claim 1, wherein the respectively mapping of the K primary synchronization signal subsequences to the corresponding OFDM symbols comprises performing DFT (Discrete Fourier Transform) computation for each of the K primary synchronization signal subsequences, mapping the primary synchronization signal subsequences, to which the DFT computation is applied, into one or more continuous carriers and performing IFFT (Inverse Fast Fourier Transform) computation, and adding CP to each OFDM symbol.

7. The method according to claim 1, wherein the respectively mapping of the K primary synchronization signal subsequences to the corresponding OFDM symbols comprises performing DFT (Discrete Fourier Transform) computation for each of the K primary synchronization signal subsequences, fixedly mapping the primary synchronization signal subsequences, to which the DFT computation is applied, into subcarrier indexes 0 to 11 of corresponding OFDM symbols and performing IFFT (Inverse Fast Fourier Transform) computation, and adding CP to each OFDM symbol, and wherein the transmitting of the primary synchronization signal mapped into the K OFDM symbols includes transmitting the primary synchronization signal by applying phase rotation to the primary synchronization signal mapped into the K OFDM symbols.

8. An evolved Node B (eNB) for transmitting a primary synchronization signal (PSS) in a wireless access system, the eNB comprising:

a transmitter; and a processor operatively connected with the transmitter, wherein the processor generates a primary synchronization signal sequence for being mapped into K OFDM (orthogonal Frequency Division Multiplexing) symbols, where K is a natural number larger than 1, wherein the primary synchronization signal sequence is generated considering a CP (Cyclic Prefix) length included in the K OFDM symbols, wherein the processor generates K primary synchronization signal subsequences respectively corresponding to the K OFDM symbols from the primary synchronization signal sequence, wherein a Nth primary synchronization signal subsequence mapped into the Nth (1≤N≤K) OFDM symbol among the K OFDM symbols includes a sequence of a certain length corresponding to the Nth OFDM symbol of the primary synchronization signal sequence, wherein the processor respectively maps the K primary synchronization signal subsequences to corresponding OFDM symbols, and transmits the primary synchronization signal mapped into the K OFDM symbols, and wherein a phase is compensated as much as a(N) for the Nth primary synchronization signal subsequence which is a sample of a certain length from z(N) sample of the primary synchronization signal sequence, and a value of the z(N) is determined by the following Equation 1, $$z(N)=v(N)*12/128,\quad\text{[Equation 1]}$$

where v(N) indicates a length of symbols accumulated from a first OFDM symbol to the (N−1)th OFDM symbol among the K OFDM symbols and CP length, and a value of the a(N) is determined by the following Equation 2, $$a(N)=\exp(-j2\pi f_x v(N)/128),\quad\text{[Equation 2]}$$

where $f_x$ indicates a lowest subcarrier index into which the Nth primary synchronization signal subsequence is mapped.

9. The eNB according to claim 8, wherein the primary synchronization signal sequence is a Zadoff-Chu (ZC) sequence.

10. The eNB according to claim 8, wherein the primary synchronization signal sequence has a length determined based on a value of the K, a CP length included in the K OFDM symbols and the number of carriers into which the primary synchronization signal subsequences are mapped.

11. The eNB according to claim 8, wherein the value of the z(N) has a real number value.

12. The eNB according to claim 8, wherein the primary synchronization signal subsequence has a length based on the number of carriers into which the primary synchronization signal subsequences are mapped.

13. The eNB according to claim 8, wherein the respectively mapping of the K primary synchronization signal subsequences to the corresponding OFDM symbols by the processor comprises performing DFT (Discrete Fourier Transform) computation for each of the K primary synchronization signal subsequences, mapping the primary synchronization signal subsequences, to which the DFT computation is applied, into one or more continuous carriers and performing IFFT (Inverse Fast Fourier Transform) computation, and adding CP to each OFDM symbol.

14. The eNB according to claim 8, wherein the respectively mapping of the K primary synchronization signal subsequences to the corresponding OFDM symbols by the processor comprises performing DFT (Discrete Fourier Transform) computation for each of the K primary synchronization signal subsequences, fixedly mapping the primary synchronization signal subsequences, to which the DFT computation is applied, into subcarrier indexes 0 to 11 of corresponding OFDM symbols and performing IFFT (Inverse Fast Fourier Transform) computation, and adding CP to each OFDM symbol, and wherein the transmitting of the primary synchronization signal mapped into the K OFDM symbols by the processor includes transmitting the primary synchronization signal by applying phase rotation to the primary synchronization signal mapped into the K OFDM symbols.

* * * * *